Oct. 14, 1941.　　　E. D. PETERSON　　　2,258,905
ATTACHMENT FOR AUTOMOBILE JACKS
Filed Nov. 17, 1939
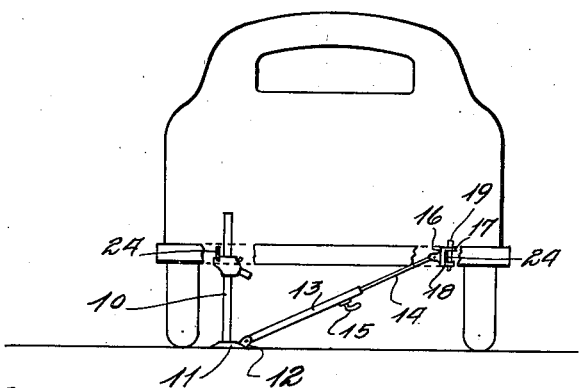
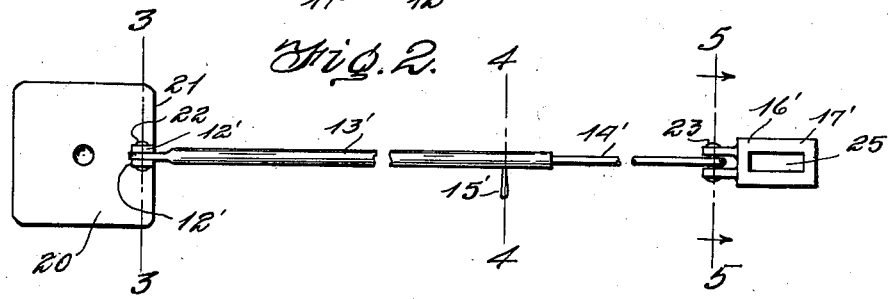
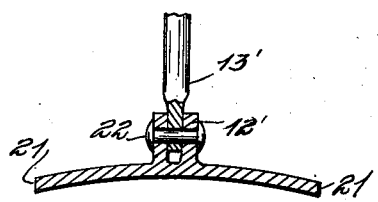
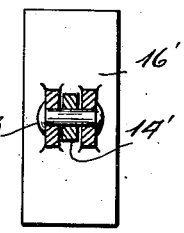
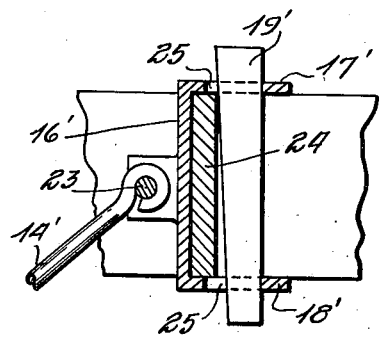
INVENTOR,
Ernest D. Peterson,
BY
Frank S. Appleman,
ATTORNEYS.

Patented Oct. 14, 1941

2,258,905

UNITED STATES PATENT OFFICE 2,258,905

ATTACHMENT FOR AUTOMOBILE JACKS

Ernest D. Peterson, Jennings, Kans.

Application November 17, 1939, Serial No. 305,028

11 Claims. (Cl. 254—134)

This invention relates to improvements in automobile jacks, and has reference more particularly to jacks of that character which in trade are identified as "bumper jacks" by reason of their being applied in use to the bumper of the automobile which is to be lifted.

It is the principal object of this invention to provide means in connection with a jack of the above character whereby the automobile or vehicle being lifted may be held against lateral shifting due to the application of lifting pressure by the jack which might cause the jack to upset and the automobile to be displaced therefrom.

More specifically stated, the present invention resides in the provision of a rigid brace or rod connected at one end to the basal portion of the jack and adapted for holding connection at its other end with a rigid part of the automobile at a point laterally of the point of application of the jack, for the purpose of holding the vehicle against lateral shifting in either direction, and thus to insure that the jack will remain in proper lifting position.

It is a still further object of this invention to provide an attachment for a bumper jack which will cooperate with the jack and a bumper bracket or support for the purpose of accomplishing the aforesaid advantages and results.

With the foregoing and other objects in view, the invention consists in the details of construction and in the arrangement and combination of parts to be hereinafter more fully set forth and claimed.

In describing the invention in detail, reference will be had to the accompanying drawing forming part of this application, wherein like characters denote corresponding parts in the several views, and in which—

Fig. 1 is a rear elevation of an automobile of conventional type, illustrating the application thereto of a jack embodying the present inventon.

Fig. 2 is a plan view of a base portion for the jack of an alternative design.

Fig. 3 is a sectional view on the line 3—3 in Fig. 2.

Fig. 4 is a sectional view on the line 4—4 in Fig. 2.

Fig. 5 is a sectional view on the line 5—5 in Fig. 2.

Fig. 6 is a sectional detail illustrating the application of the outer end of the brace rod to the bumper bracket.

Referring more in detail to the drawing:

First, it will be stated that changes in automobile design which have taken place during the last decade have brought about a requirement for a different type of automobile jack, and a different mode of applying it to the vehicle. In former years, it was the usual procedure to place the automobile jack directly below an axle of the automobile. Now, due to the present-day design of automobiles, it is a very difficult task to place the jack in lifting position below the axle, and therefore jacks are now being designed for application to the bumper of the vehicle. This place of application, however, requires that the lifting of a wheel be accomplished through the spring suspension, and consequently the vehicle body must be lifted to a considerable extent in addition to the lifting of the axle. The extent to which the vehicle body must be lifted and the relatively high point of application of the jack results in a tendency of the vehicle to shift laterally, and this tendency is augmented if the vehicle is standing on a lateral slope.

The disadvantage of the high lift, and the tendency of the vehicle to shift laterally, is overcome by the present invention, which embodies in connection with the jack, a brace rod which is fixed at one end to the basal portion of the jack, and is adapted for fixed connection at its outer end to the bumper bar or other rigid portion of the vehicle, laterally of the point of application of the jack. Since the basal portion of the jack remains steady, the connection will therefore serve the purpose of insuring a substantially direct upward lift of the vehicle, and the upsetting of the jack or lateral shifting of the vehicle is avoided.

In this drawing 10 denotes a bumper jack of any conventional type and since the details of construction of the jack are not material to a disclosure of the invention, the said jack is not illustrated except conventionally. The jack, in this embodiment of the invention, has a base 11 with lugs, such as 12, between which a shank of a tubular portion 13 of the brace is pivoted. A rod 14 forming a portion of the brace is slidable in the tubular portion 13 and is held at different positions of adjustment by a set screw 15 of the same general character as that shown in detail, Fig. 4. The set screw is threaded in the tubular member and frictionally retains the rod at different positions of adjustment. At the outer end of the rod a U-shaped head 16 is pivotally connected to the said rod in the manner shown in detail, Fig. 2. The head has two spaced approximately parallel flanges 17 and 18 which are so spaced apart as to embrace a bumper bracket and after the said head has been applied to the bumper bracket, a key or wedge 19 is inserted in slots to retain the brace in operative relation to the bumper bracket and the jack.

The enlarged detail, Figure 2, which is a modification of the association of the brace and jack, has the structural features to which reference has been made in describing the brace in Figure 1, but in the modification instead of the brace being pivoted to the jack, it is pivoted to a supporting plate 20 on which the base of the jack is deposited when it is to be used. The supporting plate has its edges 21 slightly curved downwardly so that the under surface of the plate is somewhat hollow to better engage the roadbed and prevent displacement of the said plate. Since the brace in Fig. 2 is the same as that shown in Fig. 1, but as it is modified as to its association with the supporting plate, the parts are herein described using the same reference characters as those used in Fig. 1 except that they are primed. The supporting plate, therefore, has spaced lugs 12' between which a shank of the tubular portion 13' of the brace is mounted on a pivot 22. The rod 14' is adjustable in the tubular portion 13' and is held at different positions of adjustment by a set screw 15'.

The head 16' is connected to the end of the rod by a pivot 23 and an upper flange 17' extends from the said head, whereas a similar flange in spaced relation thereto, as illustrated in Fig. 1, embraces a bumper bracket 24. The flanges 17' and 18' have slots 25 into which a wedge 19' is inserted so that the bumper bracket 24 lies between the head 16' and the said wedge. The only difference, as has been stated, between the embodiment of the invention in Fig. 1 and the other figures of the drawing is that the brace is associated directly with the base of the jack, whereas in the other figures it is associated with the supporting plate.

I claim:

1. In combination with a bumper jack, a brace having one end fixed to a basal portion of the bumper jack, and means on the end of the brace remote from the jack for engaging a rigid part of the automobile body, said brace comprising telescopically connected parts, and means for retaining the parts in different positions of adjustment.

2. In combination with a bumper jack, a base plate on which said jack is supported, a brace comprising telescopic sections one end of which is pivotally connected to the base plate, and a head on the outer end of the brace for engagement with a rigid part of the automobile for preventing lateral movement thereof with relation to the jack.

3. In combination with a bumper jack, a base plate on which said jack is supported, a brace comprising telescopic sections one end of which is pivotally connected to the base plate, and a head on the outer end of the brace for engagement with a rigid part of the automobile for preventing movement thereof with relation to the jack, said head comprising two spaced parallel members having apertures, the said parallel members being adapted to embrace a bumper bracket, and a key insertable in the apertures for retaining the head in place.

4. In combination with a bumper jack, a base plate having a concave under surface, a brace comprising two telescopically assembled members, one of the said members being pivotally connected to the base plate, means for securing the telescopic members in different positions of adjustment, a head on the outer telescopic member, and means associated therewith for anchoring it to a bumper bracket.

5. In combination with a bumper jack, a base plate having a concave under surface, a brace comprising two telescopically assembled members, one of the said members being pivotally connected to the base plate, means for securing the telescopic members in different positions of adjustment, a head pivoted to the inner of the telescopic members, said head comprising two parallel apertured members in spaced relation to each other for embracing a bumper bracket, and a key insertable in the apertures for retaining the head on the bracket.

6. In an automobile jack, the combination of a base, an upright supported on the base, means associated with the upright including a load supporting member for engaging part of the automobile for lifting the same when the load supporting member is raised, and means adapted to be associated with a basal portion of the jack and adapted to engage another portion of the automobile removed from the point being elevated and adapted to prevent the automobile from shifting laterally with respect to the jack and whereby to hold the jack from overturning when raising the automobile.

7. An automobile jack comprising, in combination, a base, and an upright supported on the base for tilting movement, said upright carrying a load supporting member for engaging a portion of the automobile for raising the same, said base having a member connected thereto, said member having a detachable connection at a remote end for engaging a remote portion of the automobile for preventing relative lateral movement between the automobile and the load supporting portion of the jack.

8. A jack base having an elongated connector attached thereto, said connector having at its outer end means for detachable connection to a suitable part of an automobile.

9. An automobile jack having a vertically shiftable load supporting member, a basal portion of said jack having connected thereto an elongated member provided on its free end with a detachable connection adapted to attach a remote part of the automobile.

10. A jack applicable to the bumper of an automobile for lifting the automobile, and a brace connected with a basal portion of the jack to extend in a direction transversely of the automobile and means at the outer end of the brace for fixed connection with a rigid part of the automobile.

11. A lifting jack of the character described, applicable to a bumper of an automobile to be lifted, and a brace member pivotally fixed to a basal portion of the jack to extend therefrom in a direction transversely of the vehicle, means at the end of the brace for detachable connection with a rigid part of the automobile body to retain it against lateral shifting relative to the jack.

ERNEST D. PETERSON.